May 16, 1950        J. G. OETZEL        2,507,573
ELECTROMAGNETIC FRICTION DEVICE
Original Filed Dec. 7, 1944
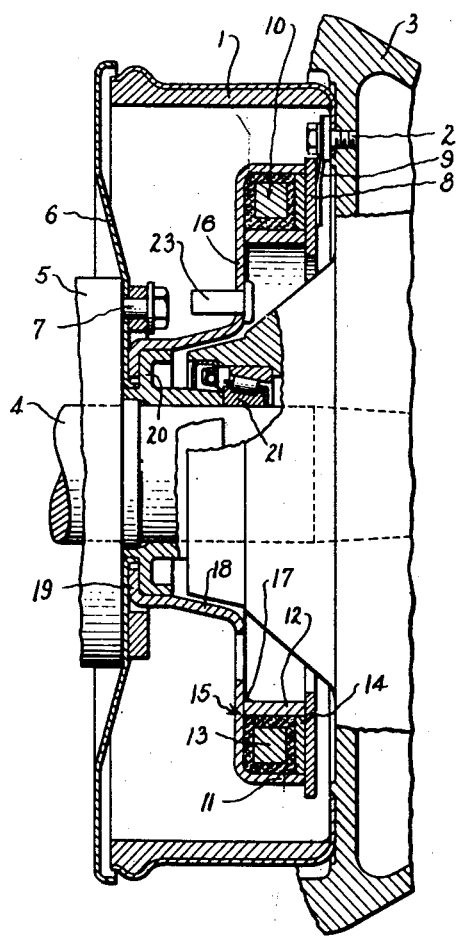
INVENTOR
John George Oetzel
BY Carlsen, Pitney, Hubbard Wolf
ATTORNEYS Patented May 16, 1950

2,507,573

UNITED STATES PATENT OFFICE 2,507,573

ELECTROMAGNETIC FRICTION DEVICE

John George Oetzel, Beloit, Wis., assignor to Warner Electric Brake Manufacturing Company, South Beloit, Ill., a corporation of Illinois Original application December 7, 1944, Serial No. 567,004. Divided and this application September 20, 1945, Serial No. 617,598

2 Claims. (Cl. 188—161)

This invention relates to electromagnetic friction devices of the type comprising axially engageable magnet and armature rings mounted for relative rotation.

The object is to provide a novel and rugged mounting for the magnet ring in a device of the above character.

Other objects and advantages of the invention will become apparent from the following detailed description taken in conjunction with the accompanying drawing which is a diametrical sectional view of the improved friction device incorporated in a vehicle brake construction.

In the illustrated embodiment, the improved friction device is mounted within a brake drum 1 secured by screws 2 to a vehicle wheel 3 rotatable on an axle 4 having a flange 5 to which the anchor plate 6 of a brake is secured by screws 7. The friction device includes a substantially flat armature ring 8 supported for yieldable axial floating movement. This is accomplished by tangentially extending leaf springs 9 rigidly secured to the vehicle wheel at one end by the screws 2, the other ends being secured to the back of the armature ring at annularly spaced points. Suitable stop means, not shown, is provided to sustain the frictional torque applied to the armature when this torque is in a direction to compress the leaf springs. The latter, in addition to supporting the armature, maintain the armature in continuous light mechanical contact with the friction face of a magnet ring 10 which is mounted in accordance with the present invention. This ring is of U-shaped cross section having two concentric poles 11 and 12 with an annular coil 13 between them and segments 14 of friction material spanning the poles and substantially flush with the end faces thereof.

Herein, the magnet is formed by welding together in abutting relation a cylinder forming the inner pole 12 and a ring 15 of Z-shaped cross section having a flange forming the outer pole 11 and a flat annulus 16 against which the cylinder 12 abuts and is welded at 17. The inner peripheral portion of the annulus 16 is bent reversely to form a tubular projection 18 having an inturned flange 19. The latter is disposed between the anchor plate 6 and the end of a collar 20 rigidly held between the axle flange 5 and the wheel bearing 21. The collar 20 provides a bearing for a portion of the tubular extension 18, the flange 19 having a running fit between the anchor plate 6 and the collar 20. This rugged mounting supports the magnet for oscillation about the wheel axis, and, together with the flange 19, is well adapted to sustain the overhanging weight of the magnet under severe bending shocks. The angular motion of the magnet may be used through a connection with a pin 23 on the ring 16 to expand a friction brake into engagement with the drum 1.

This application is a division of my co-pending application Serial No. 567,004, filed December 7, 1944, now U. S. Patent No. 2,469,402.

I claim as my invention:

1. In an electromagnetic friction device, the combination of, a magnetic ring of Z-shaped radial cross section having an outer cylindrical portion, a flat intermediate portion perpendicular to the ring axis and a tubular inner portion with an inturned right angular flange at the end thereof, a separately formed magnetic cylinder abutting against said intermediate portion and cooperating with said first cylindrical portion to form the poles of a magnet, said tubular portion being offset axially from said magnet, bearing means engaging said tubular portion and said flange and supporting the same for turning about the axis of said ring, and means bearing against opposite sides of said inturned flange to support said tubular portion against tilting under the offset weight of said magnet.

2. In an electromagnetic friction device, the combination of, a sheet metal ring having an outer cylindrical portion, an intermediate portion substantially perpendicular to the ring axis and a tubular inner portion axially offset from said cylindrical portion, means cooperating with the outer portion of said ring to form a magnet having concentric poles, bearing means engageable with said tubular portion and supporting the same for turning about the axis of said ring, and means engaging the opposite sides of said inturned flange to hold said tubular portion against axial tilting.

JOHN GEORGE OETZEL.

REFERENCES CITED

The following references are of record in the file of this patent:

UNITED STATES PATENTS

| Number | Name | Date |
|---|---|---|
| 347,075 | Timmis et al. | Aug. 10, 1886 |
| 1,822,564 | Cadman | Sept. 8, 1931 |
| 1,856,424 | Perrot | May 3, 1932 |